United States Patent
Engstrand

[19]

[11] Patent Number: 5,496,220

[45] Date of Patent: Mar. 5, 1996

[54] SENSORY SIMULATOR

[75] Inventor: Brad Engstrand, 2658 N. Dayton, Chicago, Ill. 60614

[73] Assignee: Brad Engstrand, Chicago, Ill.

[21] Appl. No.: 253,094

[22] Filed: Jun. 2, 1994

[51] Int. Cl.[6] .............................. A63G 31/16; A63J 5/02
[52] U.S. Cl. ............................ 472/60; 472/130; 434/55
[58] Field of Search ................................ 472/60, 59, 61, 472/130, 135; 434/55

[56] References Cited

U.S. PATENT DOCUMENTS

| | | |
|---|---|---|
| 2,485,435 | 10/1949 | Dehmel . |
| 3,628,829 | 12/1971 | Hellig . |
| 3,676,856 | 7/1972 | Manly . |
| 3,865,430 | 2/1975 | Tanus . |
| 3,923,300 | 12/1975 | Tanus . |
| 4,030,208 | 6/1977 | Carver et al. . |
| 4,066,256 | 1/1978 | Trumbull . |
| 4,244,120 | 1/1981 | Harris . |
| 4,251,140 | 2/1981 | Fogerty, Jr. . |
| 4,527,980 | 7/1985 | Miller . |
| 4,553,176 | 11/1985 | Mendrala . |
| 4,616,326 | 10/1986 | Meier et al. . |
| 4,642,945 | 2/1987 | Browning et al. . |
| 4,710,129 | 12/1987 | Newman et al. . |
| 4,856,771 | 8/1989 | Nelson et al. . |
| 4,879,849 | 11/1989 | Hollingsworth, III et al. . |
| 4,984,179 | 1/1991 | Waldern . |
| 4,995,603 | 2/1991 | Reed . |
| 5,015,933 | 5/1991 | Watkins et al. . |
| 5,021,982 | 6/1991 | Crosbie et al. . |
| 5,066,902 | 11/1991 | Watanabe . |
| 5,130,794 | 7/1992 | Ritchey . |
| 5,192,247 | 3/1993 | Barr et al. . |

*Primary Examiner*—Kien T. Nguyen

[57] ABSTRACT

The present invention provides a system and a method for interactively experiencing a recording. At least one seat is provided which moves in a plane simultaneously either through active participation of the viewer through movement of a joystick or passively by a signal recorded on the recording medium. The recording medium includes a motion signal provided to a controller for actuating release and supply of air to pneumatic cylinders moving the at least one seat simultaneously in the same plane in a maximum degree of movement. The recording medium may also include video and/or audio signals for displaying an image on a screen which moves in the same plane as the seat.

4 Claims, 5 Drawing Sheets

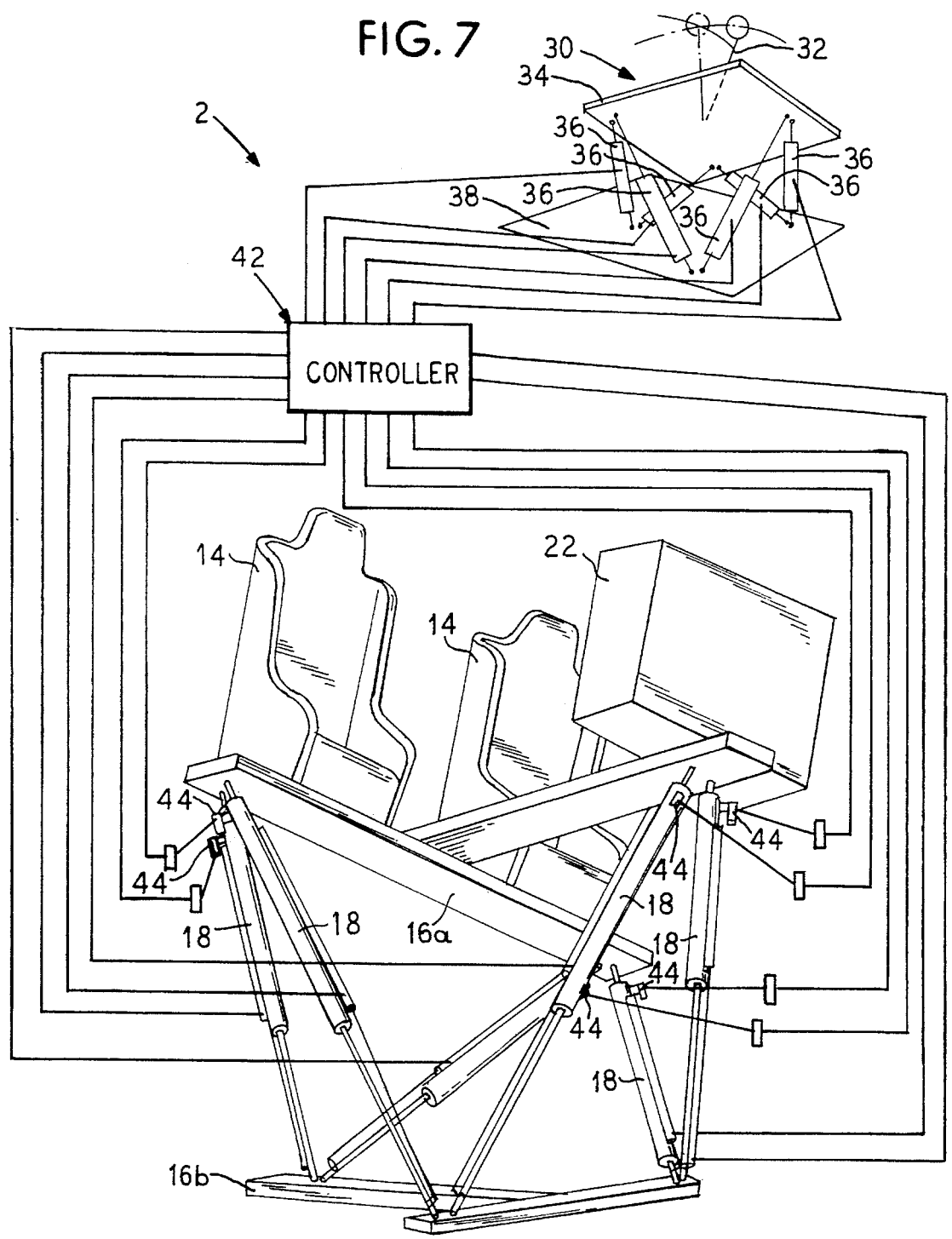

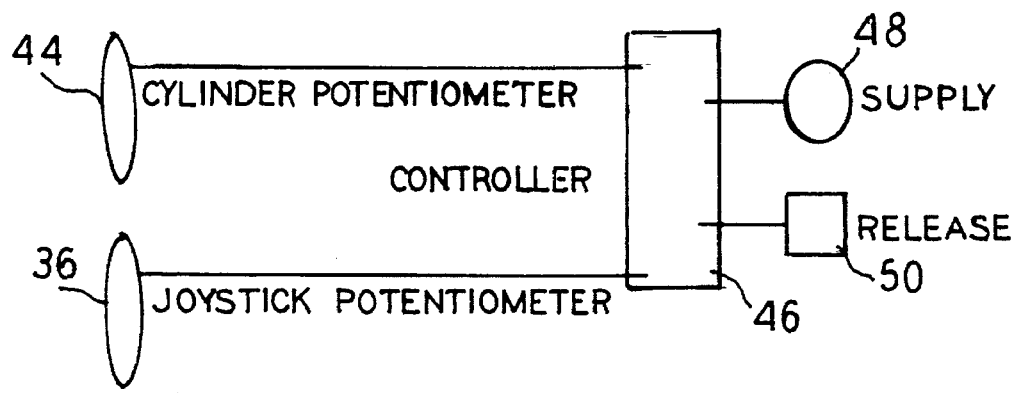
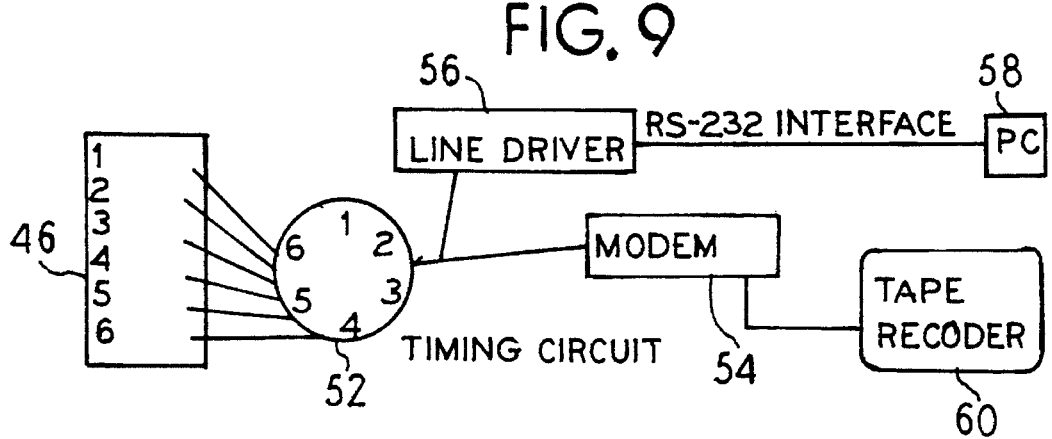
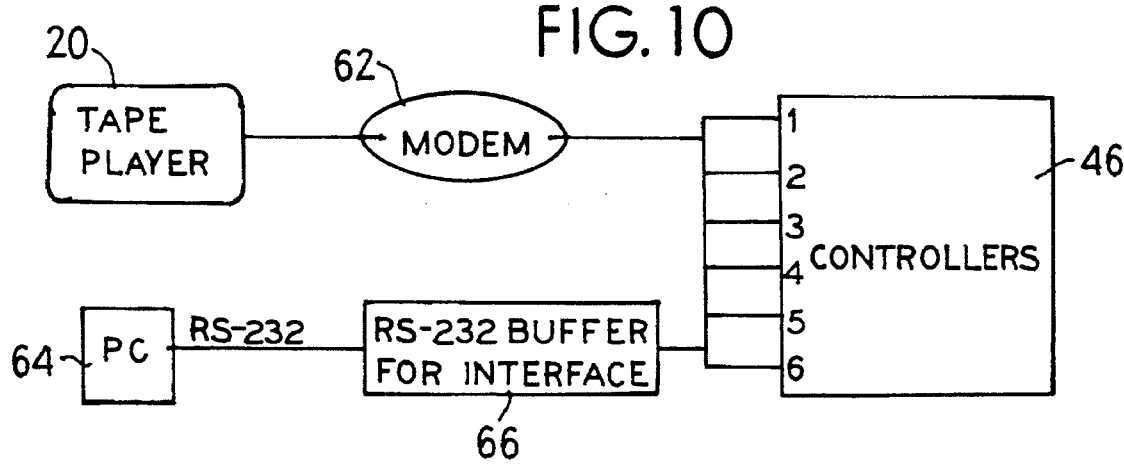

SENSORY SIMULATOR

BACKGROUND OF THE INVENTION

The present invention generally relates to a system and a method for creating motion. More specifically, the present invention relates to a system and a method in which motion signals are recorded on a recording medium and played back for an individual to experience. More specifically, the present invention relates to a system and a method in which motion signals are recorded on a recording medium along with audio and/or video signals wherein the actual motion occurring on a screen, for example, is experienced by the individual watching and listening to that on the screen.

A number of devices are generally known, particularly for amusement and entertainment, providing motion or other movement to individuals simultaneously during viewing a presentation in order to provide a combined visual and motion experience. Examples of such known devices are disclosed in U.S. Pat. Nos. 4,066,256; 4,251,140; 4,642,945; and 5,015,933.

U.S. Pat. No. 4,066,256 discloses a compact ride for an amusement park creating the illusion that passengers are seated in a rapidly maneuvering vehicle by applying forces to the passenger in sychronism with the display of a motion picture image. The apparatus includes a passenger-holding frame having three locations resting on hydraulic rams that can tilt the frame or move it up and down. A film projector and viewing screen connects to the frame to move with it. When the motion picture simulates the view from the vehicle that is turning to the right, the rams are operated to tilt the vehicle to the left to simulate the centrifugal forces that would result from a vehicle turning to the right. When the motion picture indicates forward acceleration, the vehicle is tipped backwardly. When the motion picture indicates vertical acceleration, the rams are rapidly moved up or down.

U.S. Pat. No. 4,251,140 discloses a ride assembly for simulating travel in a pre-programmed environment to passengers. The assembly includes a housing having a moveable base adapted for carrying passengers thereon. The assembly also includes a pair of supporting carriage members, the first carriage member being movably supported at the upper surface of a stationary support cradle member by a first set of bearings which allow the first carriage member to pitch about a fixed-pitch axis associated with the cradle member. The first carriage member movably supports the second carriage member at its upper surface by a second set of bearings which allows the second carriage member to roll about a variable-roll axis associated with the first carriage member. The base is fixably mounted on the second carriage member, and each portion of the base is moved through a range of pitch and roll positions. An audio-visual presentation having a sound motion picture film projector in combination with a sound system are disposed on the base and develop a sound motion picture on a spherical inner surface of the housing. The housing is mounted on the base to move therewith. Motors independently drive the first carriage member and the second carriage member under the control of a control circuit in order to move the base in synchronism with the movement of one of the projected moving objects of the moving picture wherein the motion of the base is controlled to simulate a scene moving relative to a housing as viewed by the carried passengers.

U.S. Pat. No. 4,642,945, to relates to an entertainment center having a horizontally disposed floor or decking support plate on which seating for members of an audience is arrangeable and support means on which the support plate is rotatably mounted. Orientation veering means are operable to tilt the support plate from the horizontal while drive means are operable to rotate the support plate on a support means about an upwardly extending axis. The structure also includes a drive system operable to actuate the orientation veering means, and control means operable to control actuation of the drive means and the drive system for veering the angular disposition and tilt of the support plate with respect to the axis. During presentation of a cinematic program, a viewer's perception of the action is enhanced by rotation and tilting being synchronized with visual and aural action of the program.

U.S. Pat. No. 5,015,933 to generally discloses an automated control of seat motion for seat systems used to provide combined visual and motion experience for patrons in amusement rides and the like. Occupant safety features are integrated within the seat motion control system, and centralized control of multiple motion bases is accomplished. Motion control of the seat bases is responsive to a position signal input coordinated with a visual presentation viewed by the patrons. Self-contained power systems for the actuation means of the seat base allow sizing of an entertainment theater to accommodate anticipated audiences.

Each of the known devices, however, have their drawbacks. That is, no device is presently known which can supply a simple means to only record and playback full six-axis motion. Secondly, no device is presently known which is suitable for home entertainment wherein the visual screen moves with the body in the same plane of the viewer and which further accomplishes full circular motion with a controlled g-force on three axes. Therefore, the present invention goes beyond where the prior art has left off. More specifically, the present invention satisfies three separate principles regarding the perception of movement.

The first principle is the simplest and may be referred to as "first person." First person perception of movement is achieved by mounting a camera onto anything moving, such as a car, boat, plane and the like. When the particular item is moved and the scene is married with axial movement to mimic the actual experience, the first person perception of movement is realized.

Second person perception of movement results from observing a motion within a scene. For example, a scene with an individual rowing a boat or someone pounding a nail into wood, for example, could induce perception in the individual by actually inducing similar movement. For example, long, slow, back and forth movement while watching the rowing or sharp jolts from the hammer could be induced to achieve second person perception of motion.

Finally, third person perception of motion is the most difficult to explain and is rarely perceived. As an example, a scary scene may stimulate the third person perception of motion by inducing movement during the scary scene. The movement upsets the balance of the inner ear just slightly causing a deep uneasiness, almost sub-conscious alarm, to go off just before the scariness of the scene emerges.

The present invention goes beyond that which is disclosed by the prior art by simulating all three principles regarding the perception of movement by manipulating that which is sensed by both the inner ear and pressure on the skin of an individual. The present invention stimulates these senses during viewing of a movie, for example. Further, the present invention stimulates these senses during playback with or without visual and/or audio synchronization, for example.

SUMMARY OF THE INVENTION

The present invention provides a system and a method for creating and recording motion. The present invention provides a system and a method for interactively experiencing the recorded motion with video and/or audio from a seat which moves in a plane with a screen to provide motion to the viewer as the viewer watches the screen displaying the recorded image. Of course, a listener may choose not to use the video and interactively experience only the audio with the motion, or simply experience the recorded motion.

To this end, in an embodiment, the present invention provides a system for recording and playing back motion recorded on a medium. This system comprises a bracket and at least one seat mounted on the bracket. A screen is mounted on a bracket facing the at least one seat, the screen displaying an image from the recording. A plurality of pneumatic cylinders is mounted on a level base and extends to the bracket. A controller selectively controls the supply and release of air to the plurality of pneumatic cylinders. The controller is responsive to a signal on a recording wherein the signal is indicative of a desired position of the at least one seat and further corresponds to the recorded motion on the medium.

In an embodiment, the bracket has a first leg holding the at least one seat and a second leg perpendicular to the first leg, the second leg holding the screen.

In an embodiment, at least two of the plurality of pneumatic cylinders are secured at each or both ends of the first leg and further at an end of the second leg, the six pneumatic cylinders simultaneously operative to control motion of the at least one seat and the screen on the bracket.

In an embodiment, the system further comprises a housing formed by a plurality of walls defining an interior at least partially enclosing the at least one seat and the screen.

In another embodiment, a system is provided for recording on a recording medium a signal indicative of a desired motion response. The system comprises a first surface and a joystick mounted on the first surface. A second surface is formed on a level base and a plurality of potentiometers are mounted on the second surface and extend to the first surface wherein the joystick manipulates the first surface causing each of the plurality of potentiometers to produce a signal. A controller continuously receives each of the signals from the plurality of potentiometers wherein the controller produces an output signal by combining each of the signals from the plurality of the potentiometers.

In an embodiment, the output signal is recorded on the recording medium.

In an embodiment, the plurality of potentiometers are encased within a housing defining an interior, the interior being partially defined by the first surface and the second surface.

In an embodiment, the output signal is sent to a remote control, the remote controller activating a releasing and pressurizing of a plurality of pneumatic cylinders corresponding to the plurality of potentiometers.

In another embodiment of the present invention, a method is provided for at least one individual to interactively record and experience motion while seated in an area. The method comprises the steps of: providing a device for actively recording a signal on a recording medium; interconnecting the area and the seat to provide a station; and experiencing the recorded motion from the area wherein the station is physically manipulated according to the signal on the recording medium.

In an embodiment, the method further comprises the step of enclosing the station.

In an embodiment, the method further comprises a joystick having a plurality of potentiometers mounted between two planes. One of the planes is stationary and the other plane is manipulated by the joystick thereby expanding and contracting with the plurality of potentiometers.

In an embodiment, the method further comprises the step of providing a timing circuit for actively recording the signal on the recording medium.

In an embodiment, the method further comprises the step of providing a plurality of controllers for manipulating the station.

In an embodiment, the method further comprises the steps of: providing a plurality of pneumatic cylinders for manipulating from the station; and providing a plurality of potentiometer corresponding to the plurality of pneumatic cylinders, the potentiometers measuring the length of a stroke of each of the plurality of pneumatic cylinders.

Additional features and advantages of the present invention are described in, and will be apparent from, the detailed description of the presently preferred embodiments and from the drawings.

BRIEF DESCRIPTION OF THE DRAWINGS

FIG. 7 illustrates a general electrical schematic view of the interconnections between an embodiment of the editor of the present invention and an embodiment of the viewing station of the present invention.

FIG. 8 illustrates a schematic diagram of an individual controller receiving signals from a pair of potentiometers and providing an appropriate signal to a valve of each of the pneumatic cylinders of the system of the present invention.

FIG. 9 illustrates a schematic diagram of the editing circuitry required for recording signals onto a magnetic medium for the present invention.

FIG. 10 illustrates the required circuitry for playing back a tape previously recorded with a motion signal recorded thereon.

DETAILED DESCRIPTION OF THE PRESENTLY PREFERRED EMBODIMENTS

The present invention generally relates to an editor and a viewing station for viewing images projected on a screen from a recording medium, such as a tape of a video cassette recorder to a television, such as is generally known. The present invention further generally relates to a system and a method for creating and recording motion to interactively experience with or without any recorded audio or video.

Figure 1:
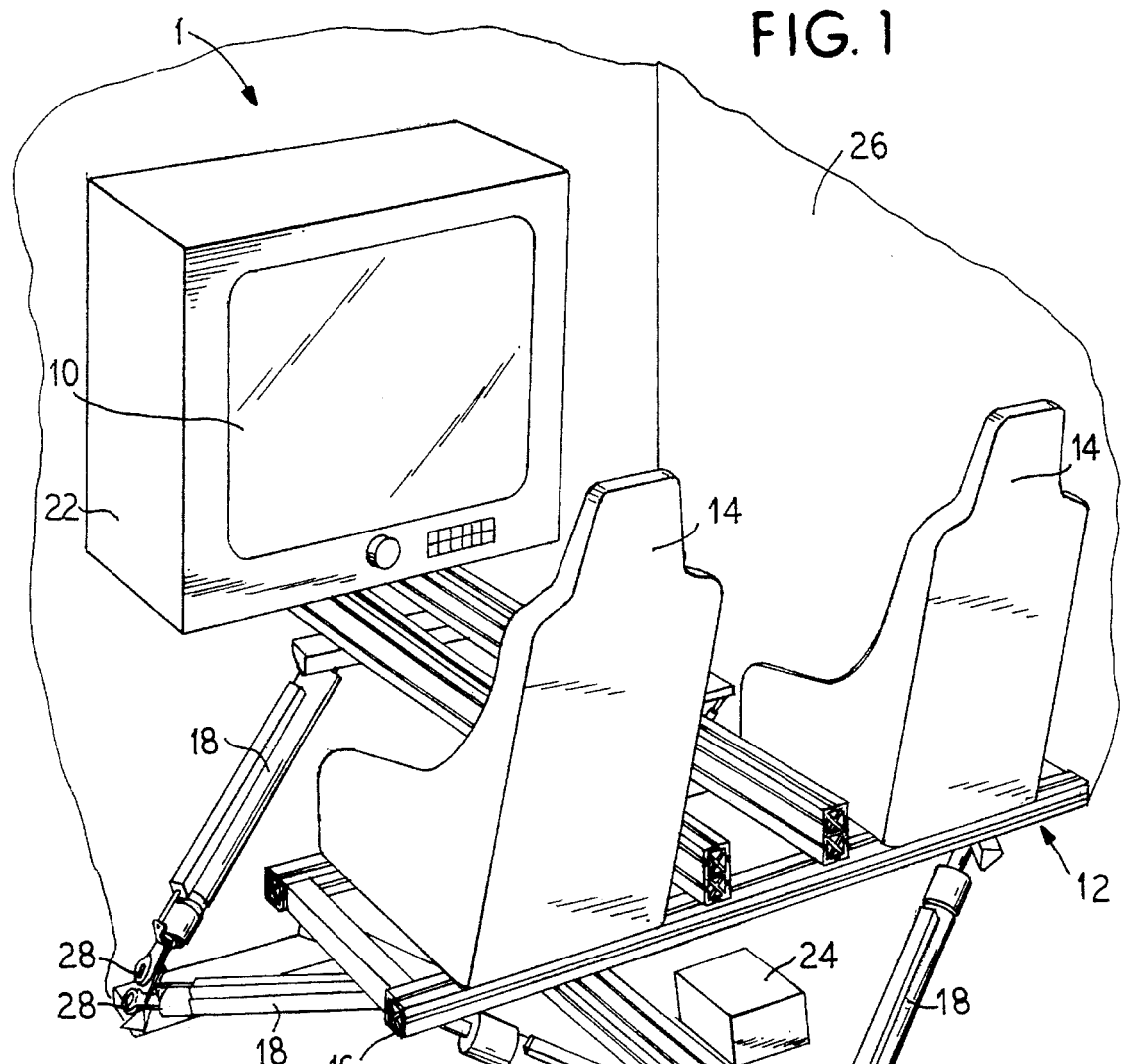
FIG. 1 illustrates a perspective view of an embodiment of a viewing station of the present invention.

Referring now to the drawings, FIG. 1 generally illustrates a viewing station 1 with a viewing screen 10 connected to a section of a frame generally designated at 12. A pair of seats 14 are constructed and arranged such that an individual sitting in one of the seats 14 faces the screen 10.

The frame 12 may be constructed in two parts 16a and 16b. Both of the parts 16a, 16b are generally configured in a T-shape. At the extremity of the T-shape are connected two ends of pneumatic cylinders 18. The parts 16a, 16b are oppositely oriented with the part 16b generally secured to a level surface, such as on a floor in a room of a house, for example. Therefore, the part 16b remains stationary and secured during use of the system. The part 16a rotates about the ends of the pneumatic cylinders with respect to the part 16b as will be described hereinafter.

Also generally illustrated in FIG. 1 is a tape playback unit 20, such as a VCR providing the necessary video and audio signals to a receiver 22 for viewing on the screen 10. The tape playback unit 20 further provides a signal to a controller 24. The controller 24 supplies and releases air to each of the pneumatic cylinders 18 based on a further signal recorded on a recording medium read by the playback unit 20.

In an alternate embodiment of the present invention, the screen may be replaced by virtual reality-type goggles (not shown). The plane of reference for a user when the goggles are worn is the platform on which the viewer sits. Therefore, having the platform as a plane of reference, rather than the floor as is common in many systems, provides the same plane of motion as when the video screen is used. The goggles are worn directly on the head of the user sitting in one of the seats 14. Virtual reality goggles are, of course, well known in the art and may be implemented by the skilled practitioner.

The viewing station 1, in an embodiment, may be partially or completely enclosed within a housing 26. The tape playback unit 20 and the controller 24 may be mounted exterior from or within the housing 26 as desired.

Figure 5:
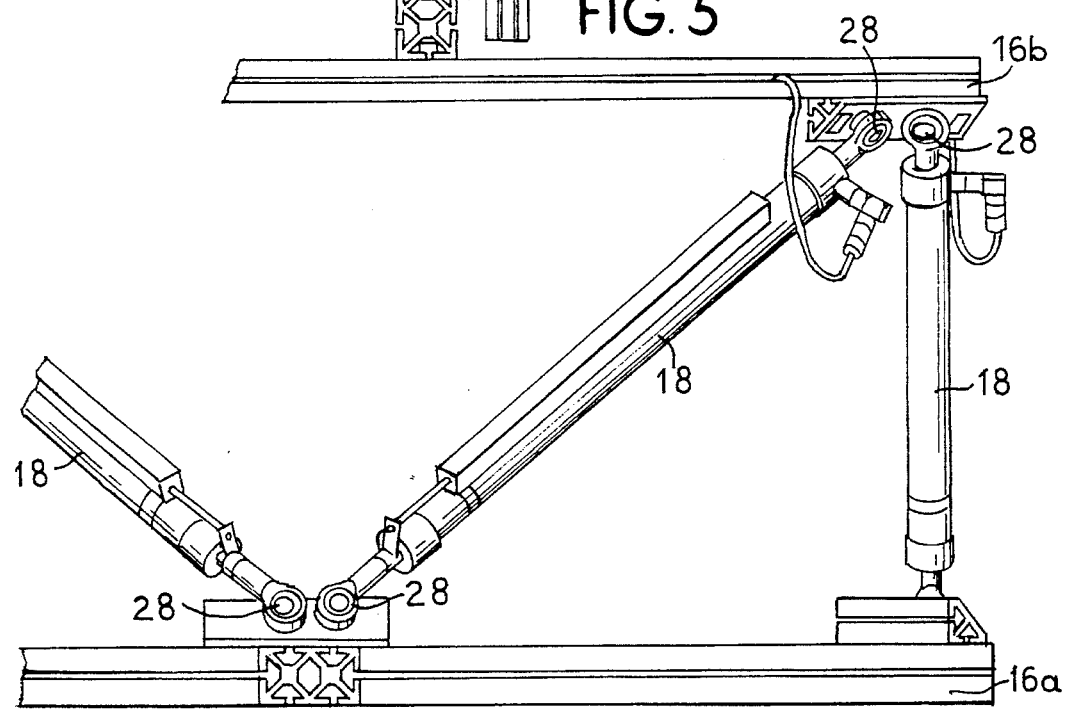
FIG. 5 illustrates a partial plan view of pneumatic cylinders connected to a base structure of an embodiment of the viewing station of the present invention.

The orientation of the parts 16a, 16b of the frame 12 and the connection of the pneumatic cylinders 18 therebetween, as illustrated in FIGS., 1, 3 and 5–7, allow for manipulation of the seats 14 and the screen 22 on the part 16a in a maximum number of orientations. Rotating pivots 28 (most clearly shown in FIG. 5) provide necessary freedom of motion between each of the pneumatic cylinders 18 and the respective parts 16a, 16b of the frame 12. The rotating pivot 28 may be connected in any manner, as is generally known in the art, to the parts 16a, 16b of the frame 12 for rotatably securing the pneumatic cylinders 18 between the parts 16a, 16b of the frame 12.

Figure 2:
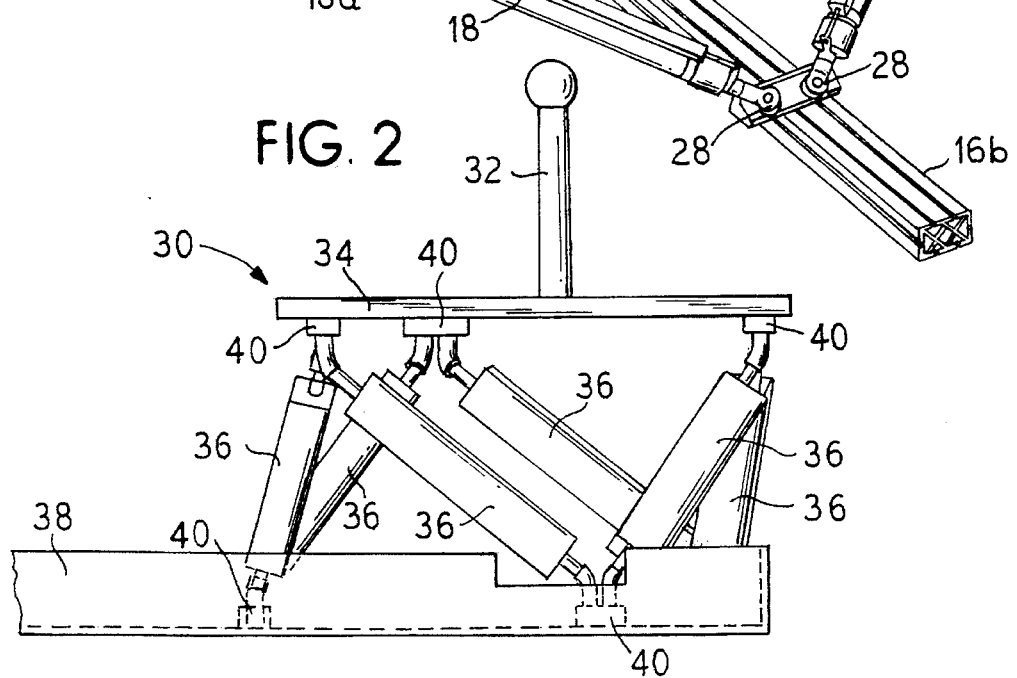
FIG. 2 illustrates a side view, partially in cross-section, of an embodiment of an editor of the present invention.
Figure 4:
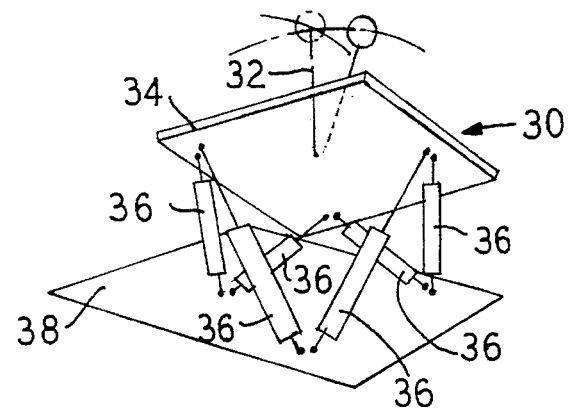
FIG. 4 illustrates a perspective view of an embodiment of the editor of the present invention.
Figure 3:
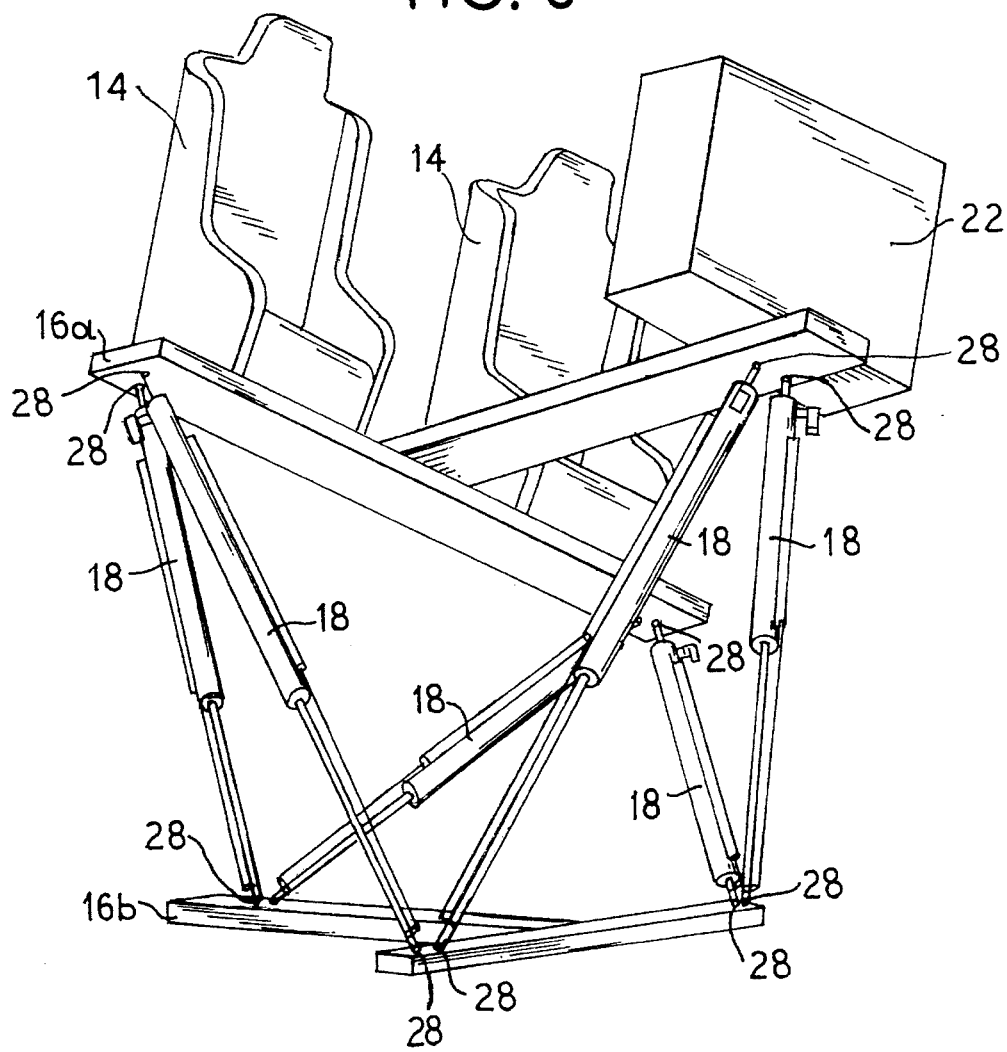
FIG. 3 illustrates a perspective view of an embodiment of the viewing station of the present invention.
Figure 6:
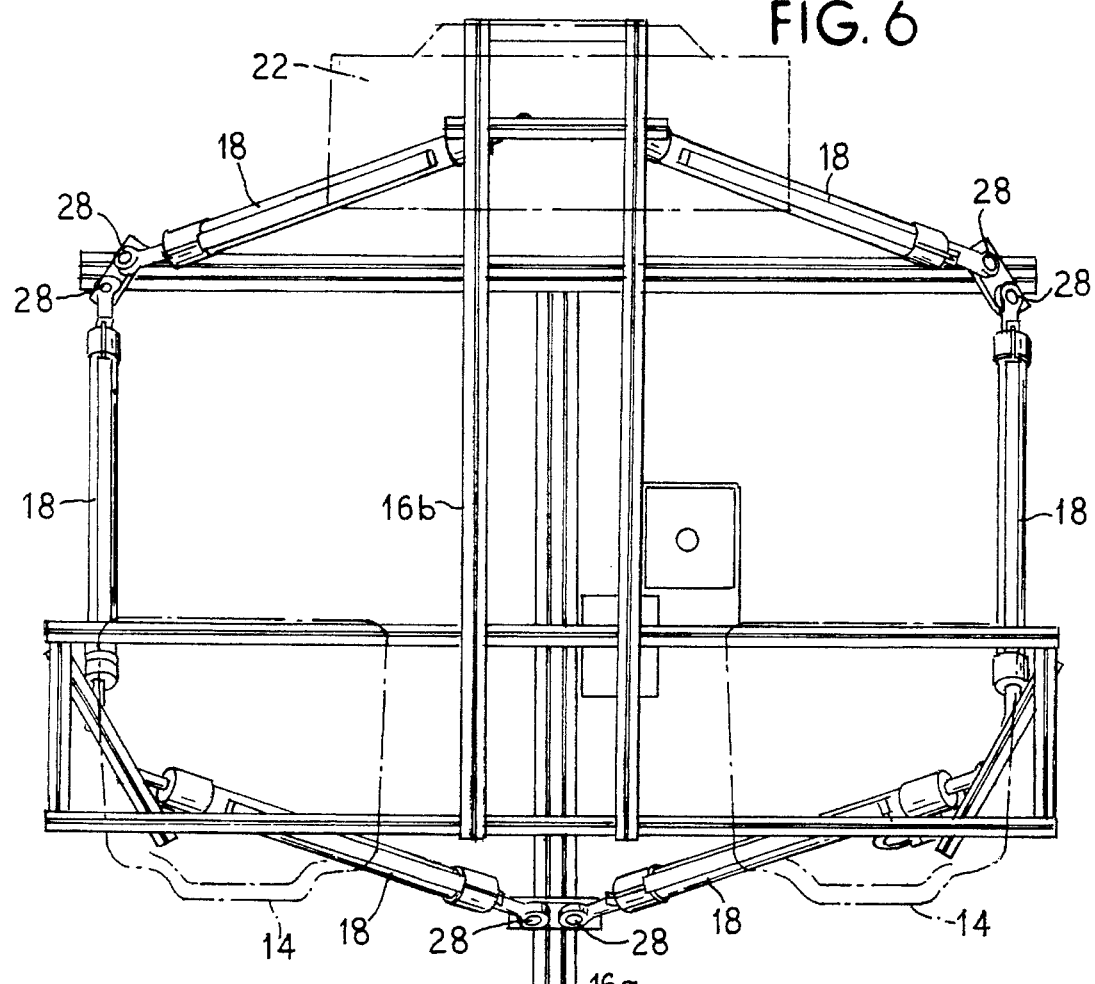
FIG. 6 illustrates a top view of an embodiment of the viewing station of the present invention.

Referring now to FIGS. 2 and 4, an editor 30 is generally illustrated. The editor 30 includes a joystick 32 attached to a surface 34. A plurality of potentiometers 36 are connected between the surface 34 and a second surface 38. The editor 30 is simply a "mini-version" of the viewing station 1 without the seats 14 and the receiver 22 with the viewing screen 10. That is, the second surface 38 corresponds to the part 16b which is mounted to a level surface like the second surface 38. The potentiometers 36 have a one-to-one relationship to the pneumatic cylinders 18 and are rotatably connected to the surface 34 and the second surface 38 by rotating pivots 40. The joystick 32, therefore, manipulates the surface 34 with respect to the second surface 38.

Referring now to FIG. 7, a controller 42 having twelve inputs from the six potentiometers 36 and the six pneumatic cylinders 18 are provided. Each individual controller 46 of the controller 42 act independently, but in parallel. Each of the individual controllers receive an input signal from a cylinder potentiometer and a joystick potentiometer.

The input signals are then compared by each of the individual controllers 46. Potentiometers 44 are physically attached to each of the pneumatic cylinders 18 and measures the length of the stroke of the cylinder 18. The other potentiometers 36 are included between the surfaces 34, 38 of the editor 30. Each of the individual controllers 46 is generally shown in FIG. 8. The controller 46 compares the cylinder potentiometer 44 and the joystick potentiometer 36. When the joystick demands more length for a given potentiometer, the controller opens a supply valve 48; on the other hand, when the joystick 32 demands less length, the controller 46 opens a release valve 50. Each of the six controllers corresponds to a matched pair of potentiometers 36 and 44. Each of the controllers 46 is required for the system 2 to operate as shown in FIG. 7.

The system 2 may operate in a real time situation. That is, one or more individuals may sit in the seat 14 or seats and experience the motion directly. The motion may be recorded by the controllers 46 being pulled by a timing circuit 52 (See FIG. 9) to a modem microchip 54 which makes sounds to be recorded on a magnetic tape. The timing circuit 52 prevents jamming of the signals by the six controllers 46 on a serial out party line to the modem chip 54. Further, information may be provided from the six controllers 46 through an interface serial line driver 56 to communicate with a personal computer 58 or the like. This is done simultaneously with the modem 54. The buffer from the personal computer 58 to the controllers 46 brings the voltages down so the controllers 46 are unharmed. As a result, a recorder 60 may interactively record desired motion onto a tape or other magnetic medium for playback for an individual viewing the tape later in the viewing station 1 on the viewing screen 10.

FIG. 10 illustrates playback from a magnetic medium, such as a tape. The tape playback unit 20 sends signals to a modem 62 deciphering the signal into a code for the controllers 46. The controllers 46 respond and carry out the necessary movement by supplying and/or releasing of air to the pneumatic cylinders 18. Therefore, the code on the tape read by the tape playback unit 20 substitutes the reading from the joystick potentiometer 36 for a digitally recorded one read by the tape playback unit 20.

In an embodiment of the present invention, a personal computer 64 may be provided for reading, for example, virtual reality games recorded on a magnetic disk, for example. An RS-232 buffer 66 is provided from the personal computer 64 to the controller 46 to bring the voltages down so the controllers are unharmed. The system operates identically to that described previously with respect to viewing of a recorded medium on, for example, a tape played back by a video cassette recorder.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for recording and playing back motion recorded on a medium, the system comprising:

a bracket with at least one seat mounted on the bracket;

a plurality of pneumatic cylinders mounted on a level base and extending to the bracket;

a controller selectively controlling supply and release of air to the plurality of pneumatic cylinders, the controller responsive to a signal on the medium wherein the signal is indicative of a desired position of the at least one seat and further corresponds to the recorded motion on the medium; and a screen mounted on the bracket facing the at least one seat, the screen displaying an image recorded on the medium wherein the bracket has a first leg holding the at least one seat and a second leg, the second leg holding the screen.

2. The system of claim 1 wherein at least two of the plurality of pneumatic cylinders are secured at each of both ends of the first leg and further at an end of the second leg, the six pneumatic cylinders simultaneously operative to control motion of the at least one seat and the screen on the bracket.

3. The system of claim 1 further comprising:

a housing formed by a plurality of walls defining an interior at least partially enclosing the at least one seat and the screen.

4. A system for recording and playing back motion recorded on a medium, the system comprising:

a bracket with at least one seat mounted on the bracket;

a plurality of pneumatic cylinders mounted on a level base and extending to the bracket; and a controller selectively controlling supply and release of air to the plurality of pneumatic cylinders, the controller responsive to a signal on the medium wherein the signal is indicative of a desired position of the at least one seat and further corresponds to the recorded motion on the medium and the bracket has a first leg holding the at least one seat and a second leg perpendicular to the first leg wherein at least two of the plurality of pneumatic cylinders are secured at each of both ends of the first leg and further at an end of the second leg, the six pneumatic cylinders simultaneously operative to control motion of the at least one seat and the screen on the bracket.

* * * * *